(12) United States Patent
Wahl et al.

(10) Patent No.: US 8,590,689 B2
(45) Date of Patent: Nov. 26, 2013

(54) CONVEYOR SYSTEM

(75) Inventors: Matthias Wahl, Langquaid (DE);
Martin Seger, Neumarkt (DE); Johann Huttner, Mallersdorf-Pfaffenberg (DE)

(73) Assignee: Krones AG, Neutraubling (DE)

( * ) Notice: Subject to any disclaimer, the term of this patent is extended or adjusted under 35 U.S.C. 154(b) by 194 days.

(21) Appl. No.: 13/227,527

(22) Filed: Sep. 8, 2011

(65) Prior Publication Data

US 2012/0055757 A1 Mar. 8, 2012

(30) Foreign Application Priority Data

Sep. 8, 2010 (DE) .......................... 10 2010 040 410
Sep. 8, 2010 (DE) .......................... 10 2010 040 413

(51) Int. Cl.
*B65G 1/00* (2006.01)
(52) U.S. Cl.
USPC .................. 198/347.1; 198/594; 198/805
(58) Field of Classification Search
USPC .................. 198/347.1, 347.2, 594, 812, 805
See application file for complete search history.

(56) References Cited

U.S. PATENT DOCUMENTS

| | | | |
|---|---|---|---|
| 4,054,202 A | | 10/1977 | Hautemont |
| 4,981,208 A | * | 1/1991 | Jones ............................ 198/778 |
| 6,478,134 B2 | * | 11/2002 | Pattantyus-Abraham et al. .......................... 198/339.1 |
| 6,591,963 B2 | * | 7/2003 | Wipf .......................... 198/347.2 |
| 6,698,581 B2 | | 3/2004 | Steeber et al. |
| 6,793,062 B2 | | 9/2004 | Hammock et al. |
| 6,817,464 B2 | | 11/2004 | Biondi et al. |
| 7,011,205 B2 | * | 3/2006 | Draghetti et al. ............. 198/778 |
| 7,163,099 B2 | * | 1/2007 | Mueller ..................... 198/347.3 |
| 7,191,896 B2 | | 3/2007 | Hartness et al. |
| 7,219,788 B2 | | 5/2007 | Tuck et al. |
| 7,810,629 B2 | * | 10/2010 | Kronseder et al. ......... 198/347.1 |
| 7,926,642 B2 | | 4/2011 | Huttner et al. |
| 8,028,820 B2 | | 10/2011 | Giehrl et al. |
| 8,365,905 B2 | * | 2/2013 | Fege ............................. 198/812 |

FOREIGN PATENT DOCUMENTS

| | | |
|---|---|---|
| DE | 68902646 T3 | 7/1997 |
| DE | 102004053663 A1 | 8/2005 |
| DE | 102008044430 A1 | 2/2010 |

(Continued)

OTHER PUBLICATIONS

Search Report for DE 10 2010 040 413.6, dated Apr. 1, 2011.

(Continued)

*Primary Examiner* — Gene Crawford
*Assistant Examiner* — Keith R Campbell
(74) *Attorney, Agent, or Firm* — Marshall, Gerstein & Borun LLP

(57) ABSTRACT

A conveyor system having at least one variable capacity storage for a bottle treatment machine at least two guides running laterally adjacent and at least one transfer guide are provided for a bottle carrier chain of curve-going coupled bottle carriers, with runs of the bottle carrier chain being transferable from one guide to the adjacent guide via the transfer guide are drivable along the guides. Each of the guides comprises at least one continuous tension member drivable by at least one conveyor drive of the conveyor system, and a respective run of the bottle carrier chain is arranged a certain distance along a tension member, guided there by the tension member and by means of automatically releasable and engageable positive fit and / or magnetically engaging couplings in the area of the transfer guide is driven by the tension member.

28 Claims, 6 Drawing Sheets

(56) References Cited

FOREIGN PATENT DOCUMENTS

| | | |
|---|---|---|
| DE | 202008010177 U1 | 4/2010 |
| DE | 202008014282 U1 | 4/2010 |
| EP | 0442200 A1 | 8/1991 |
| EP | 0581143 A1 | 2/1994 |
| EP | 1161391 A1 | 12/2001 |
| EP | 1232974 A1 | 8/2002 |
| EP | 1849725 A1 | 10/2007 |
| WO | WO-2010005300 A1 | 1/2010 |
| WO | WO-2010049019 A1 | 5/2010 |

OTHER PUBLICATIONS

Search Report for DE 10 2010 040 410.1, dated Apr. 1, 2011.
Search Report for EP 11176568.1 mailed Dec. 23, 2011.

* cited by examiner

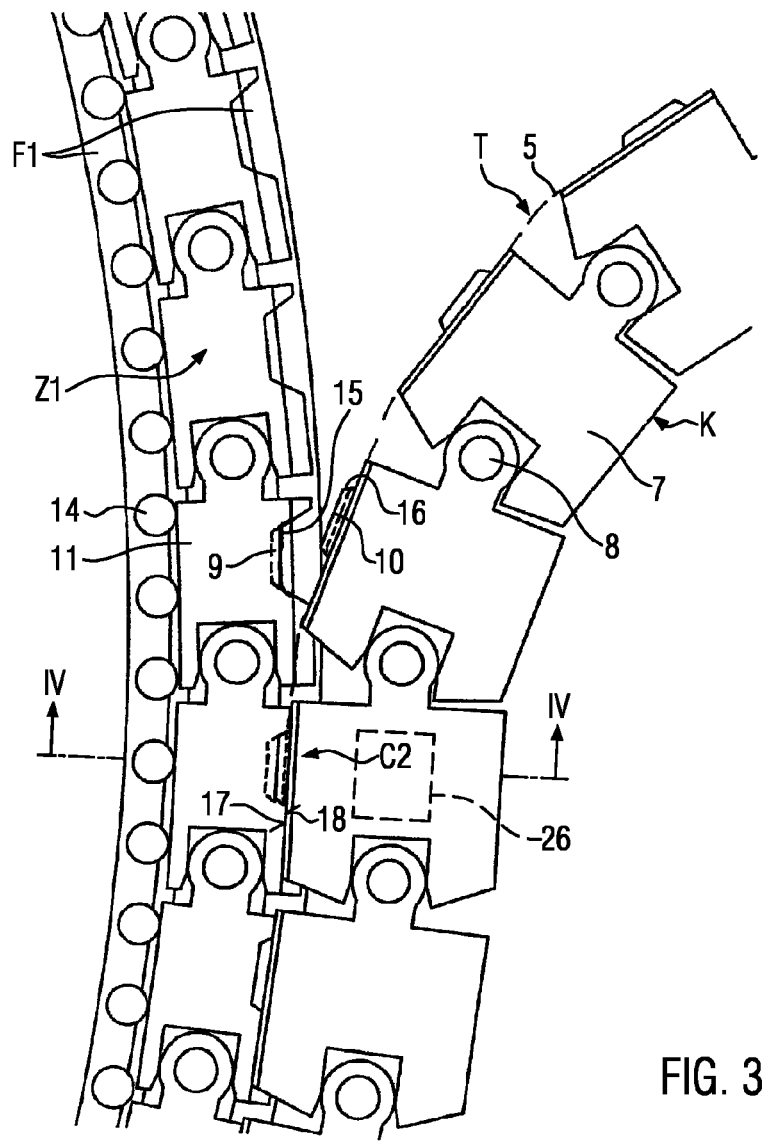
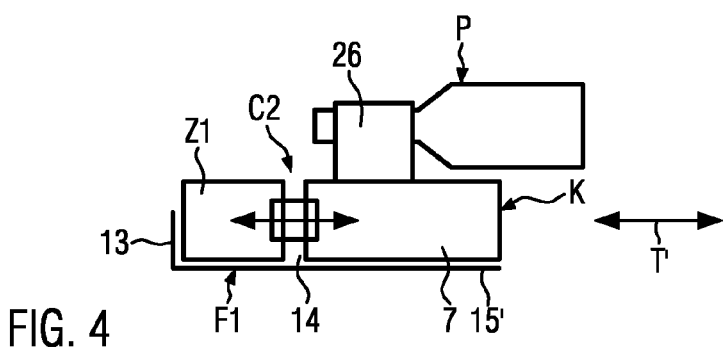
FIG. 3
FIG. 4

US 8,590,689 B2

CONVEYOR SYSTEM

CROSS-REFERENCE TO RELATED APPLICATION

The present application claims the benefit of priority of German Application No. 102010040413.6, filed Sep. 8, 2010 and German Application No. 102010040410.1 filed Sep. 8, 2010. The entire text of the priority application is incorporated herein by reference in its entirety.

FIELD OF THE DISCLOSURE

The disclosure relates to a conveyor system, such as used in beverage bottling operations according to the preamble of claim 1.

BACKGROUND

In bottle treatment machines a conveyor system is provided for transporting bottles, such as PET bottles, between various stations. In the conveyer system, multiple conveying paths can be provided, between which the bottles are to be transferred for distributing or sorting. Alternatively or additionally, a variable capacity storage can be incorporated into the conveyor system, which in the event of failure or malfunction of a station temporarily stores the bottles delivered to a station and not received at the same rate, or for a faster receiving rate supplies enough bottles, in order to create a time buffer within which ideally the malfunction is eliminated, so that the bottle treatment machine is continuously operable. In both cases, it is standard to use the bottle carrier chain simultaneously as a tension member to which the conveying movement is applied. For a change of path between different conveying paths each with a bottle chain, it is necessary to take the bottles off a bottle carrier chain and to transfer them onto the other bottle carrier chain. This requires a number of tension members and bottle carrier chains. Due to the dual task of bottle carrier chains being used as tension members, namely the load-bearing function and the driving function, such bottle carrier chains are complex, expensive and prone to damage. In the second case of a storage having the bottle carrier chain fulfilling the drive function and the load-bearing function, it is necessary during deflection, to release the bottle carrier chain from a guide and insert it into another. In addition, the bottle carrier chain, fulfilling the driving movement along the guides and the load-bearing function, must be of a great length, for instance as an endless loop.

A conveyor system of a bottle treatment machine is known from DE 10 2004 053 663 A, where, in the storage formed as a storage tower, two neighboring guides are disposed in a helix-shaped manner in which at least a portion of an endless loop of the bottle carrier chain is guided and driven, and in which a carriage with two transfer guides is movably arranged in order to be able to vary the capacity of the storage as required. The bottle carrier chain is directly driven, is a special link chain, and carries plate-like bottle carriers or bottle grippers on the upper side. In the respective transfer area, the bottle carrier chain is released from the guide by mechanical means of the transfer guide, guided and deflected in the transfer guide and by mechanical means again inserted into the other guide. This results in considerable strain for the bottle carrier chain, which due to the considerable strain is stabile and heavy, and relatively high driving power is required which in turn can subject the bottle carrier chain to considerable local tension stress. Frictional engaged contact, for instance, can also occur between the bottles, the guides and the like, leading to contamination and wear of the bottles.

A conveyor system of a cigarette processing machine is known from EP 0 581 143 B, in which either a single chain-type conveyor element is used simultaneously for initiating the drive movement and for carrying the load, or a load bearing conveyor element is driven independently in each of two separate guides. A variable capacity storage is integrated into the conveyor system, which has at least one transfer guide for deflecting the conveyor flow from one guide onto the other guide. In the case of only a single endless conveyor element, it is in the transfer area released from a guide, transferred and re-inserted into the other guide. In the second case with the two conveyor elements drivable independently of each other in the two guides, the transfer guide is designed as a bridge-shaped conveyor element which receives the flow of cigarettes from a conveyor element, transfers it and conducts it to the other conveyor element.

A goods-conveyor system having a variable capacity storage is known from EP 1 161 391 B, in which two load-carrying belt carrier chains are driven and guided in two adjacent guides which at the same time fulfill a load-bearing function. In the transfer area, a rotatable conveyor disc is moveably arranged between and the guides and along them, which at the same is driven in rotation by both belt carrier chains in order to receive goods, transfer and again load them onto the other belt carrier chain.

A conveyor system comprising a substantially straight-lined conveyor path for the same or similar objects is known from EP 1 232 974 B, which in piece goods processing are treated in multiple processing steps. Along the conveying path, a guide for a load-bearing belt carrier chain is provided on both sides of the guide, toothed belt drives or drive wheels are arranged there, which are driven at a desired speed of circulation corresponding to the conveying speed, and transfer it to the load carrier chain with which they overlap for a certain distance. Transfer of the drive speed is effected by magnetic force contact, for which the belt drives or drive discs carry permanent magnets, and armature elements or counter magnets are arranged at the belt carriers of the belt carrier chain.

SUMMARY OF THE DISCLOSURE

The disclosure has as one aspect to provide a conveyor system of the type mentioned above, which is operationally reliable, universally variably operable, and during operation is subjected to only moderate forces and tensions, and for which there is no wear and no contamination of the bottles in a transfer area. The conveyor system is preferably characterized by a storage at low costs and ease of design as well as by wear-resistance and operation not prone to failure.

By separating the function of receiving and transferring the drive speed from the function of load-carrying and conveying bottles, each passing tension member has only a driving function without the need of assuming or supporting significant loads. Driving the tension member by means of one or several motors is possible, which preferably can be arranged closely consecutive, so that the tension force being effective in the tension member can be maintained at a low level. The tension member may therefore be designed in a relatively light and delicate manner, thus also its motion resistance is kept low and only small masses need to be moved. As the bottle carrier chain has only the load-bearing and the conveying function and conveys bottles in the transfer area and along the guides, it can be composed of simple bottle carriers coupled in a manner to negotiate curves, which transfer the carried load onto support elements, without burdening the tension members therewith. The magnetic couplings transfer the tensile forces in a slip-free manner and evenly distributed them between the guide and the run of the bottle carrier chain, so that the bottle carrier chain as well as the tension member is subjected to only small local tensile stress, thus allowing for light and cost-effective design of the bottle carrier chain. In the transfer area, neither separate transfer of only the bottles is required, nor do switch elements that are complicated or prone to wear need to be mechanically coupled off or on at the tension members. The couplings act solely with magnetic contact, solely with positive fit or with a combination of magnetic engagement and positive fit and are automatically released and engaged, respectively, when the bottle carrier chain leaves one tension member or approaches the other tension member. The guides of the driven tension members can be designed in a simple manner. Owing to the couplings, the distributed coupling forces achieve effective stabilization of the bottle carrier chain. There is no wear and no contamination is transferred between the tension member and the bottles. The deliberately established contact between the bottle carrier chain and the tension member supports the bottle carrier in this run in a stable manner at the guided tension member, so that guiding complexity for the bottle carrier chain can be reduced, e.g. only simple load-bearing support suffices. The bottle carrier chain thus uses the guide of the tension member by which it is driven, the coupling engagement assisting in guiding. The bottle carrier chain might possibly even require no load-bearing support.

In an advantageous embodiment, each coupling is released and engaged by a relative movement of at least one bottle carrier relative to the tension member forced by the transfer guide. The engagement force being predeterminable and largely constant among the couplings decreases digressively after a small relative motion or immediately returns progressively after a small final relative motion, respectively. This means that significant forces between the transfer guide and the bottle carriers are to be transferred only at the start and the end of a transfer in order to have the couplings released or engaged, respectively. Releasing and engaging the coupling is gentle, so that the bottles are not subjected to any significant vibrations.

The disclosure is particularly useful for a conveyor system comprising at least a storage, where in the storage the transfer guide can be a transfer return bend, for the bottle carrier chain then formed in an endless manner, disposed movably along the guides for the tension members. The tension members are driven along the guides in opposite directions at variable speeds, preferably, independently of each other. The couplings are automatically released and engaged by having the transfer return bend acting on the bottle carrier chain in the transfer area. No other mechanical aids are required. The couplings perform over long periods free of wear and without having the coupling effect diminish. Furthermore, they are in their effectiveness not susceptible to gases, radiation or liquids which are frequently used in bottle treatment machines.

In one alternative embodiment of the conveyor system, two or more than two guides are provided, each having only one tension member. At least two of the tension members are driven in the same directions and e.g. driven synchronously, another one in the opposite direction. The transfer guide is either a switch for changing paths of the bottle carrier chain between the tension members or conveying path of the conveyor system, driven in the same direction or a transfer return bend for deflecting the bottle carrier chain between tension members driven in opposite directions and possibly at different speeds. This embodiment may cooperate with a variable capacity storage or be operated without a storage, in order to distribute or sort bottles into different conveying paths, without having to arrange a continuous bottle carrier chain along every conveying path.

Since the tension member does not have to fulfill any load-bearing function, it can be an inexpensive and simple and light link chain. The bottle carrier chain and the link chain can be provided with identical or different partitions between the links and the bottle carriers, respectively. Different partitions are e.g. possible, because the tension members always run along their guides, and only the bottle carrier chain either along the guides or through the transfer area.

In the bottle carrier chain, successive bottle carriers are preferably coupled in either a pivot joint or in a pivot/slide joint being pivotable or pivotable/slideable in preferably only two opposite directions. The pivot joint can have a pivot axis being essentially perpendicular to the drive direction of the tension member, which advantageously can also be perpendicular to the plane in which the transfer guide lies. As a result, the bottle carriers always support each other in a stable manner even when they pass through the transfer area.

Depending on the manner in which the bottles are transported, meaning e.g. standing, lying, hanging or the like, the bottle carrier chain runs along the common path either above or below the tension member, respectively, or laterally adjacent.

In a particularly advantageous manner, each magnetic engagement coupling comprises at least one permanent magnet and one armature element or a second permanent magnet with opposite magnetic polarization at the tension member, being magnetically attractable by the permanent magnet, and a bottle carrier. Along the run of the bottle carrier chain overlapping the path of the tension member, there are many coupling points having essentially the same coupling forces in the mutual contact areas, so that the tension force of the tension member is transferred in an evenly distributed manner to the bottle carrier chain.

The permanent magnets or armature elements, respectively, can be formed plate-like or disc-shaped and are arranged on support surfaces which are located either on the outside of the tension member or the bottle carrier, respectively, or sunk-in so that there are no projections.

It is advantageous to have the relative movement being forced by the transfer guide be oriented in a plane defined by the transfer guide, in which the magnetic engagement and/or positive fit of each coupling acts or to which it is perpendicular. In the first case, the coupling is released and engaged by a pivoting motion, whereas in the second case, a parallel relative wiping motion can be used for releasing and engaging.

The positive-fitting coupling is by using the relative motion automatically releasable and engageable, in that a lateral hook and lateral hook receptacle are provided on the tension member and the bottle carrier, which in the engaged state engage in the direction of tension of the tension member up to the driving contact between the tension member and the bottle carrier and interlock with each other transverse to the direction of tension. The positive fit transfers the tension force or the drive speed, respectively, in a slip-free manner. The interlock, transverse to the direction of tension, guides the bottle carrier chain at the tension member. Both, that is the driving contact and the interlock are each released or engage automatically when a bottle carrier in the transfer area is released from the tension member or approaches it, respectively. The bottle carrier chain possibly needs to be supported only under the load.

The hook is advantageously arranged on a link of the tension element formed as a link chain. This hook pulling and supporting a bottle carrier can simultaneously comprise a portioning nose for a bottle carrier following in the direction of tension. Multiple positive-fitting and friction-locked support between the tension member and the bottle carrier chain is thus ensured.

In the embodiment with a positive fit and a magnetic engagement coupling, there are engagement and counter-engagement elements provided joinably engageable laterally to the direction of tension on the tension member and the bottle carrier, respectively, which in the engaged state engage in the direction of tension of the tension member with driving contact. The additional magnetic engagement ensures and disburdens the drive contact. For this, at least one permanent magnet and one armature element or a second permanent magnet with opposite magnetic polarization, being magnetically attractable by it laterally to the direction of tension are mounted at the tension member and a bottle carrier. When releasing due to the relative movement, the magnetic engagement and the positive fit are released, when engaging, however, are essentially simultaneously established. If necessary, magnetic engagement is established only at the end of the engaging motion or released right at the beginning of the releasing motion.

Between the coupling and the pivot joint or pivot/slide joint, respectively, of the bottle carrier, there is advantageously a distance provided defining a release lever. The greater this distance can be chosen design-wise, the lower the stress on the transfer guide during release or engagement of the coupling.

Each bottle carrier is advantageously provided with at least one coupling. Alternatively, each bottle carrier can be provided with several couplings in case of bottle carriers being longer in the conveying direction, or some bottle carriers might even be conveyed without any coupling.

In a structurally simple manner, each bottles carrier comprises at least one bottle platform, preferably with at least one stop for a bottle, or at least one bottle gripper, depending on the desired kind of transport for the bottles.

For reasons of costs, it is advantageous to form the bottle carriers as substantially identical plastic injection molding elements. As a result, the bottle carrier chain is formed in a cost-effective and light manner, which in interaction with a delicate and light link chain as a tension member requires only relatively low driving forces despite high conveying speeds.

The tension member is preferably driven outside of the storage and/or within the storage, by at least by one conveyor motor. Due to the concept of separation of functions, however, multiple consecutively arranged conveyor motors could be provided along the tension member, in order to distribute the driving forces and keep the local stresses in the tension member at a low level. Multiple conveyor motors can even be arranged closely consecutive.

In the guide, at least one frame-fixed side guide member of the tension member can simultaneously form a load-bearing support member for instance the underside of the bottle carriers.

At least in the storage, the guides of the tension members can be arranged in a curved manner. They preferably follow a spiral path or a helical path in a storage tower. The tension member is configured as a link chain and supported in the guide with rollers either on the side facing the inside of the bend of the guide, in order to maintain the movement resistance as low as possible. However, ascension of the link chain due to the tension on the outer side of the bend can easily be prevented in that fingers of the link chain reach under a guide member of the guide. This ensures low vibration, low noise and steady running of the link chain even at high conveying speeds.

The tension chains can in a variation be replaced by a continuous series of shuttles, which although no longer being mechanically connected to each other, are still controlled in an integrated manner. It is advantageous to select only one speed-dependent electrical control of the incoming and the outgoing shuttles, which greatly simplifies control complexity. Coupling the carrier chain to form shuttles then referred to as "tension-shuttles" is achievable by either magnetically or mechanically releasable connections. A combination of a magnetic or mechanical connection being again releasable is conceivable. In the area of deflection, the carrier chain is guided similar to a common energy chain.

BRIEF DESCRIPTION OF THE DRAWINGS

Embodiments of the disclosure are explained with reference to the drawings. They show in.

DETAILED DESCRIPTION OF THE PREFERRED EMBODIMENT

Figure 1:
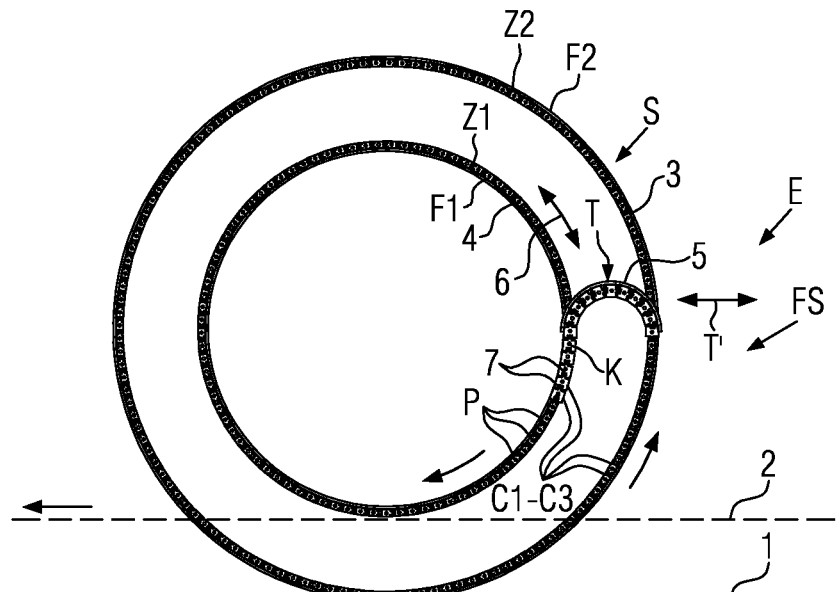
FIG. 1 in plan view and schematically a section of a conveyor system of a bottle treatment machine comprising a storage, FIG. 2 a plan view of a detail of the conveyor system, FIG. 3 a plan view of a detail of another embodiment, FIG. 4 a schematic section view in FIG. 3 in the plane IV-IV, FIG. 5 a plan view of a further detail variation, FIG. 6 a schematic plan view of a further embodiment of a conveyor system, FIG. 7 a schematic plan view of a further embodiment of a conveyor system, FIG. 8 a section similar to FIG. 4 of a further detail variation, FIG. 9 an alternative variation to the embodiment illustrated in FIG. 3, FIG. 10 a section through the embodiment of FIG. 9 along the line X and FIG. 11 an alternative embodiment to the variation shown in FIG. 9.

FIG. 1 shows a section of a conveyor system FS, for example, of a bottle treatment machine E, where the conveyor system FS extends between stations, not shown, of the bottle treatment machine E delivering and/or treating bottles P. Part of the conveyor system FS can in accordance with FIG. 1 be formed as a storage S, for example, as a storage tower with spiral-like or double-helix-shaped conveyor paths 3, 4. For example, straight-lined conveyor paths 1, 2 deliver the bottles P, a variable number of which can be temporarily stored in the storage S. Along the respective conveying paths 1, 2, 3, 4, guides are provided for tension members, for example guides F1, F2 for tension members Z1, Z2 in the conveying paths 3, 4.

At least one transfer guide T is provided in the storage, in the illustrated embodiment a transfer return bend 5 overlapping approximately 180°, which is movable in the direction of a double arrow 6 between the conveying paths 3, 4, and along the guides F1, F2, in order to vary the capacity of the storage S. The bottles P are transported by means of a bottle carrier chain K (e.g. an endless chain loop) in a standing, hanging, or lying manner or any other way. The bottle carrier chain K is composed of curve-going bottle carriers 7 coupled with one another, carries the load, and is guided and driven by the tension members Z1, Z2 in certain paths.

Figure 2:
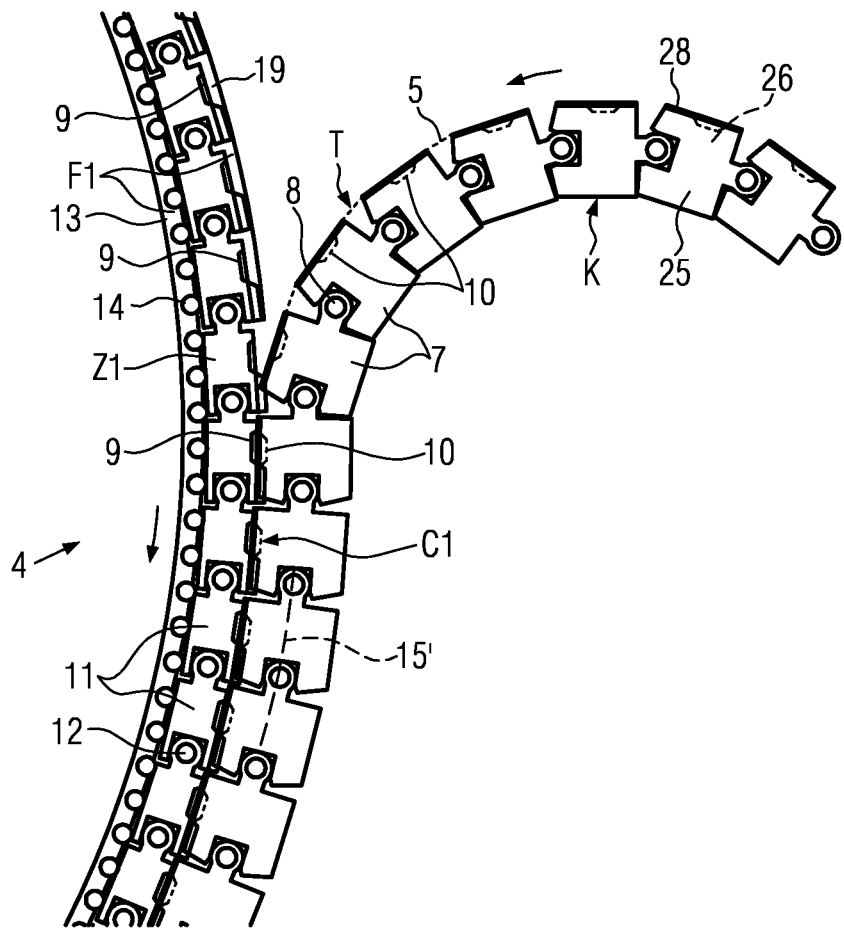

FIG. 2 illustrates a transfer area of the bottle carrier chain K to the conveying path 4. A first tension member Z1 is guided in a first guide F1 following a left bend. The tension member Z1 is for instance a link chain formed by curve-going links 11 coupled with one another comprising pivot joints 12, which run between inside and outside guide members 13, 19 of the guide F1, where rollers 14 are provided on the links 11 on the inner side or the guide member 13 and plates 20 engaging from below on the outer side of the bend curvature of the guide member 19, preventing the tension member Z1 from ascending under tension force. The tension member Z1 is for example driven by one or multiple conveyor motors M (FIG. 6) of the conveyor system FS possibly arranged closely consecutive within the storage S or outside the storage S. The drive speed of the tension member Z1 is e.g. variable. In a second guide F2 being in parts parallel to the first guide to F1, the second tension member Z2 is guided, which can be driven by the same or at least its own conveyor motor (not shown).

The first and second guides F1, F2, run preferably over a certain conveying distance at a constant separation distance adjacent to each other in a plane T, which is parallel to the plane of the transfer guide T. The driving speeds of the two tension members Z1, Z2 may be identical or different and variable. The transfer guide T is guided movably in the direction of the double arrow 6 along the guides F1, F2, as is conventional for such storages. The directions of movement of the tension members Z1, Z2 are opposite to each other. Depending upon which speed of movement of the two tension members Z1, Z2 is higher, the transfer guide T moves along with the respective tension member that runs faster, at a relative speed of movement in dependency of the difference in speed of movement. This increases or decreases the capacity of the storage, which means, either more bottles P can be temporarily stored in the storage S than received, or more bottles P can received than supplied. If the speeds of movement of the two tension members Z1, Z2 are nominally equal, then the transfer guide T remains in place (receive rate of the bottles P equals supply rate).

In the embodiment illustrated in FIG. 2, the bottle carriers 2 are coupled together in a curve-going manner by pivot joints 8. In an embodiment not shown, pivot/slide joints could here be provided, which likewise ensure curve mobility. The bottle carriers 7 are, for instance, injection-molded plastic elements which on the top side comprise bottle platforms or bottle grippers (not shown). The links 11 of the link chain of each tension member Z1, Z2 can be injection-molded plastic elements, preferably with metal reinforcement, or can be made of metal.

Since the tension members Z1, Z2 transfer only the drive speed to the load-bearing bottle carrier chain K and stabilize it in the direction of movement while the load can be supported in another way, the tension members Z1, Z2 can be delicate, relatively light and simple link chains.

The speed of movement of the tension member Z1 is, like in FIG. 2, transferred to the run of the bottle carrier chain K, which over a over a certain distance extends essentially congruently with the respective tension members Z1, Z2, by means of mutual contact (positive fit) and multiple couplings C1 (in FIG. 2). Each magnetic coupling C (at least one magnetic coupling C can be provided for each bottle carrier C1) for the embodiment shown, acts with magnet engagement 7 between at least one permanent magnet 9 on a link 11 of the link chain and a permanent magnet magnetically polarized oppositely on a bottle carrier 7. There could be only one permanent magnet 9 or 10 provided and the other magnetized component is an armature element. The permanent magnets 9, 10 are plate- or disc-shaped and mounted on supporting surfaces 21, 23, which can be located on the outer sides of the links 11 or of the bottle carrier 7, respectively, or sunk-in, as shown, so that the permanent magnets 9, 10 or the armature element, respectively, does not protrude, but is flush or even possibly recedes somewhat. Magnetically interacting components and/or the links 11 and the bottle holders 7 can contact each other to stabilize the bottle carrier chain K at tension member Z1

The inside and outside guide members 19, 13 for the tension member Z1 are arranged fixed to the frame. The topside of the guide member 19 possibly forms a load-carrying support 15' for the bottle carrier 7. Magnetic engagement of each coupling C1 in FIG. 2 acts approximately in the plane T' in which the transfer guide T deflects the bottle carrier chain K to the tension member Z1. In this, each bottle carrier 7 executes a relative pivotal movement in the pivot joint 8 relative to a link 11 in the plane T' of the transfer guide T, by means of which the coupling C1 is automatically engaged C1 in a pivot-closing motion (The release process of tension member Z2 is performed automatically in the opposite manner)

The transfer guide T formed as a transfer return bend 5 in FIG. 2 can for transferring comprise an additional guide member, e.g., for the upper outer edge of each bottle carrier 7, which acts both in releasing as well as in engaging the magnetic coupling C1-C3 and during the transfer or deflecting movement, respectively. The engaged couplings C1 not only transfer the drive speed, but also stabilize and guide the bottle carrier chain K, so that possibly no own support for the bottle carrier chain K is required.

In FIG. 2, each bottle carrier 7 comprises a top-side bottle platform 25, which may be supplemented by a stop or a stop surface 28. Instead of a platform 25, a bottle-gripper (indicated by dashed lines at 26) could also be provided on the bottle carrier 7.

In the embodiment in FIG. 2, the bottle carrier chain K and the tension member Z1 are quasi brought into mutual blunt contact by the magnetic engagement. The drive speed or tension force, respectively, is transmitted via magnetic engagement and possibly friction in the contact areas. The bottle carrier chain K is stabilized at the tension member Z1.

In the embodiment in FIG. 3, couplings C2 acting with magnetic engagement and positive fit are provided between the bottle carriers 7 and the links 11 of the tension member Z1 formed as a link chain. In this, relatively weak permanent magnets 9, 10 can be used since the positive fit transmits the drive speed and tension force, respectively, and enhances stabilization of the bottle carrier chain K at the tension member Z1. At the links 11 and the bottle carriers 7, respective engagement and counter-engagement members 15 and 16 fitting into another are provided, for example, blocks 16 with trapezoidal cross-section or the shape of truncated pyramids, and corresponding negative depressions 15 in the links 11. The bottle carrier 7 and the links 11 contact either via the engagement and counter-engagement members 15, 16 and/or via their side surfaces being adjacent to one another, where the permanent magnets 9, 10 lock the positive fit of the coupling C2 as long as the transfer deflection bend 5 does not become effective. Each coupling C2 is released under the action of the transfer return bend by a pivotal opening motion about the pivot axis 8 and a pivotal closing motion about the pivot axis 8 of the bottle carrier 7.

FIG. 4 shows in a schematic sectional view in the plane IV-IV in FIG. 3, how the bottle carrier chain K is in a stabilized manner laterally adjacent to the tension member Z1 guided by it, and possibly transfers the load onto the support 15'. The tension member Z1 is guided in a supported manner between the schematically indicated guide elements 13, 14 of the guide F1, not only in the direction of movement but also against twisting or one-sided ascension.

In FIGS. 3 and 4, conveying the bottles P in a lying manner is indicated, each of which is held at least by means of one bottle gripper 26 on the bottle carrier 7. FIG. 4 also evidences the plane T' in which the transfer deflection bend 5 of the transfer guide T releases and engages the couplings C2.

Under the condition that in FIGS. 3 and 4, for example, a side guide is provided for the bottle carrier chain K at the bottom-side support 15' for the bottle carrier chain K, magnetic engagement of the couplings C2 could be omitted, so that the couplings C2 only act with positive fit for transferring the drive speed or tension force, respectively.

Figure 5:
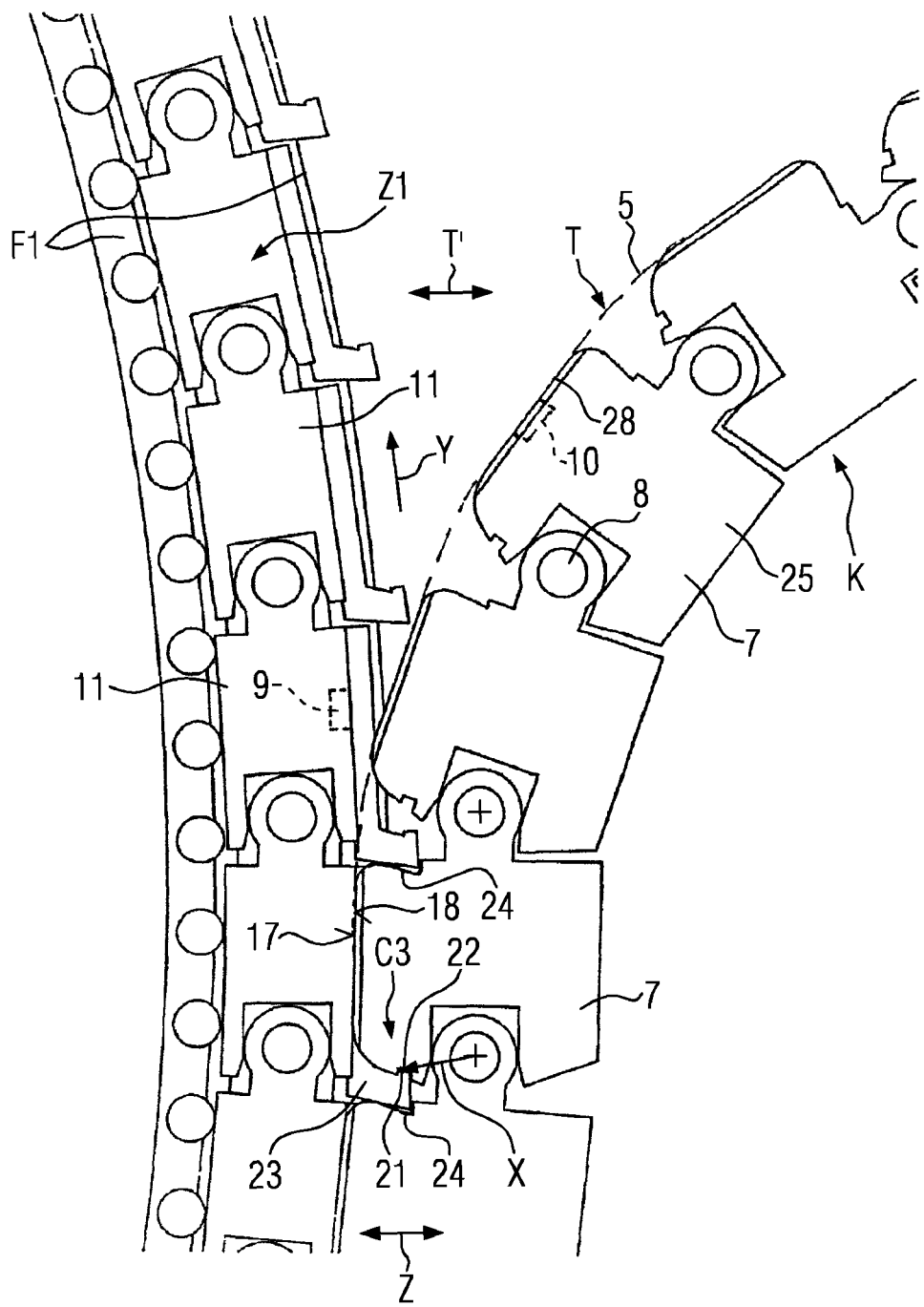

In the embodiment in FIG. 5, couplings C3 acting only with positive-fit engagement are provided between the bottle carriers 7 and the links 11, in order to transfer the drive speed or tension force, respectively, and to stabilize bottle carrier chain at the tension member C3. If necessary, the positive-fit couplings C3 guide the bottle carrier chain in such a stable manner, that it does not require separate support for the load.

On one side of each link 11 of the tension member Z1, a lateral hook 21 on a lateral arm 23 is formed at the rear, here assuming an upwards running direction Y. On the other hand, each bottle carrier 7 comprises a hook receptacle 22 on its side facing the tension member Z1, and in the conveyance direction Y at the rear, which matches the hook 21 as well as, possibly a positioning receptacle 24 being at the front end in conveying direction. In engaged state of the coupling C3, the hook 21 engages with the hook receptacle 22 in conveyance direction Y using a driving contact, while the arm 23 of the link 11, preceding in conveyance direction Y, engages with the positioning receptacle 24, and the link 11 can abut contacting with its outer side 17 an outer side 18 of the bottle carrier 7. The positive fit between the hook 21 and the hook receptacle 22 is defined by the pivot axis 8 of each bottle carrier 7, distanced by a release or engagement lever, respectively, which is defined by a distance X.

In the relative movement of each bottle carrier 7 forced by the transfer deflection bend 5 relative to a link 11 of the tension element Z1, the hook 21 is released from the hook receptacle 22, where the arm 23 had previously left the positioning receptacle 24, so that ultimately the driving connection acting in the conveyance direction Y and also the interlock acting transverse to the conveyance direction Y and in the plane T (double arrow z) is no longer effective. The bottle carrier chain K is released from the tension member Z1 and is transferred by the transfer guide T to the other tension member. There, the couplings C3 automatically re-engage in a reverse manner, that is, first a hook 21 engages with a hook receptacle 22 before the next arriving arm 23 is engaged in the positioning receptacle 24 and the side surfaces 17, 18 possibly contact each other.

It would be sufficient to use only the hooks 21 and the hook receptacles 22, and omit positioning via the receptacle 24. It is also not necessary to have the side surfaces 17, 18 contact one another in a blunt manner. Furthermore, the positive fit, as indicated by dashed lines, could be supported by magnetic engagement in that the permanent magnets 9, 10 or a permanent magnet and a magnetically attractable armature element are provided.

It is in any case significant, that the positive fit of the respective coupling C3 established in FIG. 5 does not only transfer the drive speed and the tension force, but also stabilizes the bottle carrier chain K transverse to the conveyance direction Y at the tension member Z1.

Figure 8:
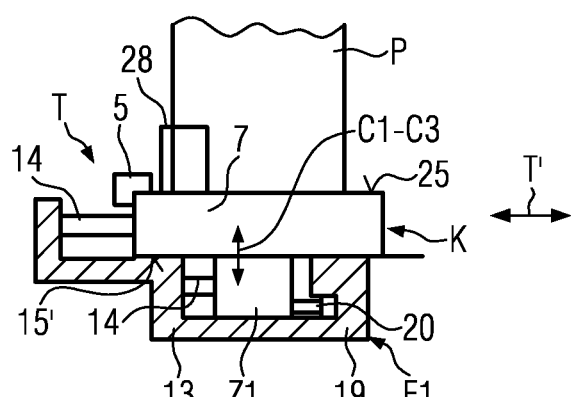

FIG. 8 illustrates, moreover, in a section similar to that of FIG. 4, that the bottle carrier chain K does not necessarily need to be arranged laterally beside the tension member Z when the drive speed or tension force is transmitted, but the bottle carrier chain could also be disposed above the tension member Z1 (as shown in FIG. 8), or below (not shown, for example, for hanging transportation of bottles P).

In the embodiment indicated schematically in FIG. 8, the tension member Z1, e.g. a link chain, is supported similar to the curved section in FIG. 2 on the inner side of the curve via rollers 14, which can be arranged on the tension member Z1 or the guide element 13, on the outside, however, fingers 20 that reach under a guide element 19, so that the tension member Z1 cannot ascend under the tension force on the outer side in the curve. The guide elements 13, 19 of the tension member Z1 could possibly simultaneously form the support member 15' for the underside of its bottle carrier 7 of the bottle carrier chain K to carry the load of bottles P and keep them away from the tension member Z1. The bottle carrier chain can at the inner side of the curve also be guided by rollers 14, where the transfer deflection bend 5, for example, engages on the outsides of each bottle carrier 7, when it arrives at the transfer area. The bottle carrier 7 comprises the bottles platform 25 and the stop 28 for securing and positioning a bottle P standing on it.

If the magnetic coupling C1-C3, indicated in FIG. 8, acts only with magnetic engagement, then magnetic engagement can be oriented perpendicular to the plane T' in which the transfer guide T forces the relative movement. If only positive fit is provided in the respective coupling, it must, for example, be releasable and engageable similar to FIGS. 4 and 5 either in the plane T', or, as in FIG. 5, by the relative pivotal movement about the pivot axis 8, respectively with the release and engagement arm of the distance X.

Figures 6, 7:
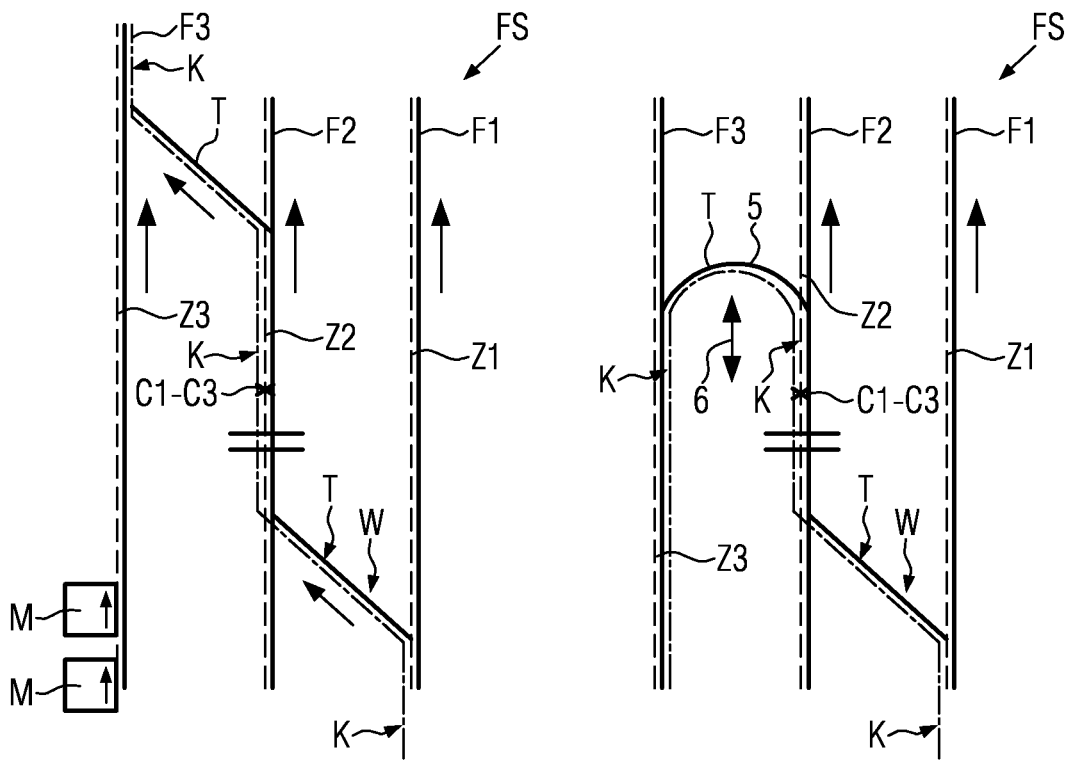

In the conveyor systems FS suggested sectionally and schematically in FIGS. 6 and 7, at least two guides F1, F3 are provided running adjacently to another, in each of which a tension member Z1, Z3 is guided. The tension members Z1, Z2 are driven in the same direction, for instance, synchronously or at different speeds. The transfer guide T is formed as a switch W being fixed or movable along the guides F1, F2, in order to enable a change of lanes for the bottle carrier chain K, driven by the respective tension member F1 or Z1, respectively, for example for sorting or distributing streams of bottles. The bottle carrier chain K is coupled with the respective tension member F1, F2 via couplings C1-C3 at a location where the runs of the bottle carrier chain K overlap with the tension members Z1, Z2. The magnetic couplings C1-C3 are automatically released and engaged, respectively, by means of the relative movement between the bottle carrier chain K and the respective tension member Z forced by the transfer guide T (switch W). If the tension members Z1, Z2 should have different speeds, then the switch W must be movable along the guides F1, F2. In FIG. 6, a third guide F1 is provided for a third tension member Z3, which has the same direction of movement as the tension members Z1, Z2. Another transfer guide T (switch W) enables transferring the bottle carrier chain K also to the third tension member Z3. FIG. 6 also illustrates at least two conveyor motors M disposed consecutively, preferably closely one behind the other, for driving at least one, several, or all the tension members.

In the embodiment shown in FIG. 7, the third tension member Z3 is driven in the direction opposite to the direction of movement of the first and second tension members Z1, Z2. The nominal speed of the third tension member Z3 can be equal to the nominal drive speed of the other tension members Z1 and/or Z2, or be different therefrom and/or be variable. The transfer guide T is a transfer return bend 5, which deflects the bottle carrier chain K e.g. over 180° and is possibly movable in the direction of the double arrow 6. Likewise in FIG. 7, the automatically releasable and engageable couplings C1-C3 are provided to transfer the respective drive speed and tension force without slip to the bottle carrier chain K. In the transfer area, the bottles remain on the bottle carrier chain K while it changes the track or the conveying path, respectively. Only one bottle carrier chain K (e.g., as an endless chain) is required, and two or three or more simple tension members Z1-Z3 for driving it. The tension members Z2 and Z3 in FIG. 7 could be runs of an endless tension member, e.g. an endless link chain or a toothed belt.

The permanent magnets 9 and/or 10 are conveniently made of neodymium or other rare earths, so that they being of a small size and having a low weight have a long running life and high power density.

Figure 9:
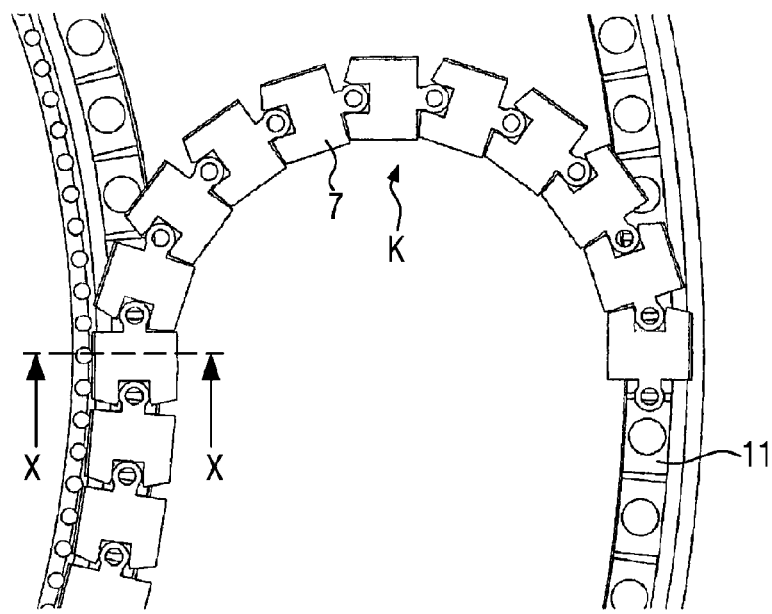
Figure 10:
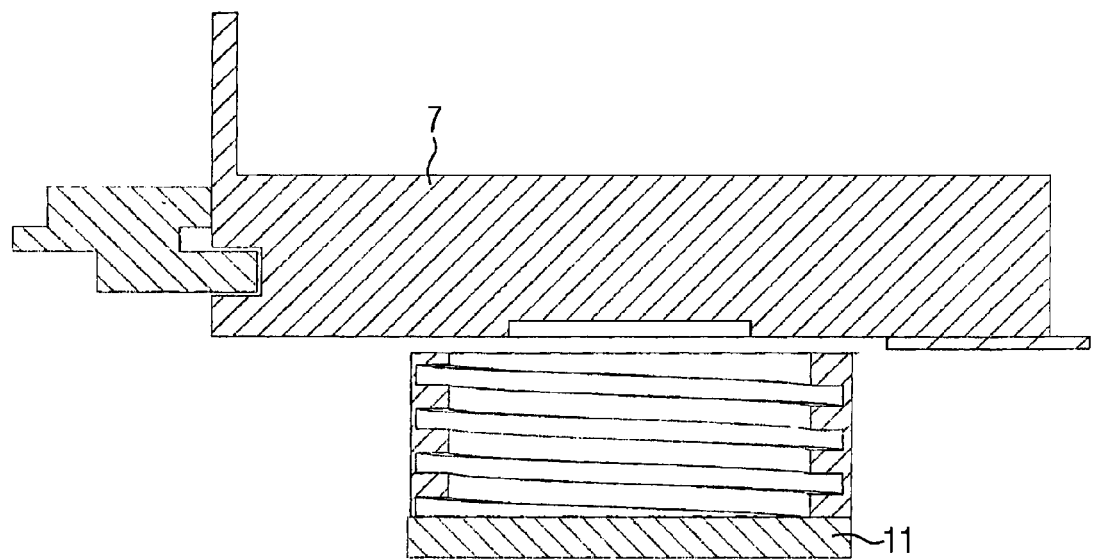
Figure 11:
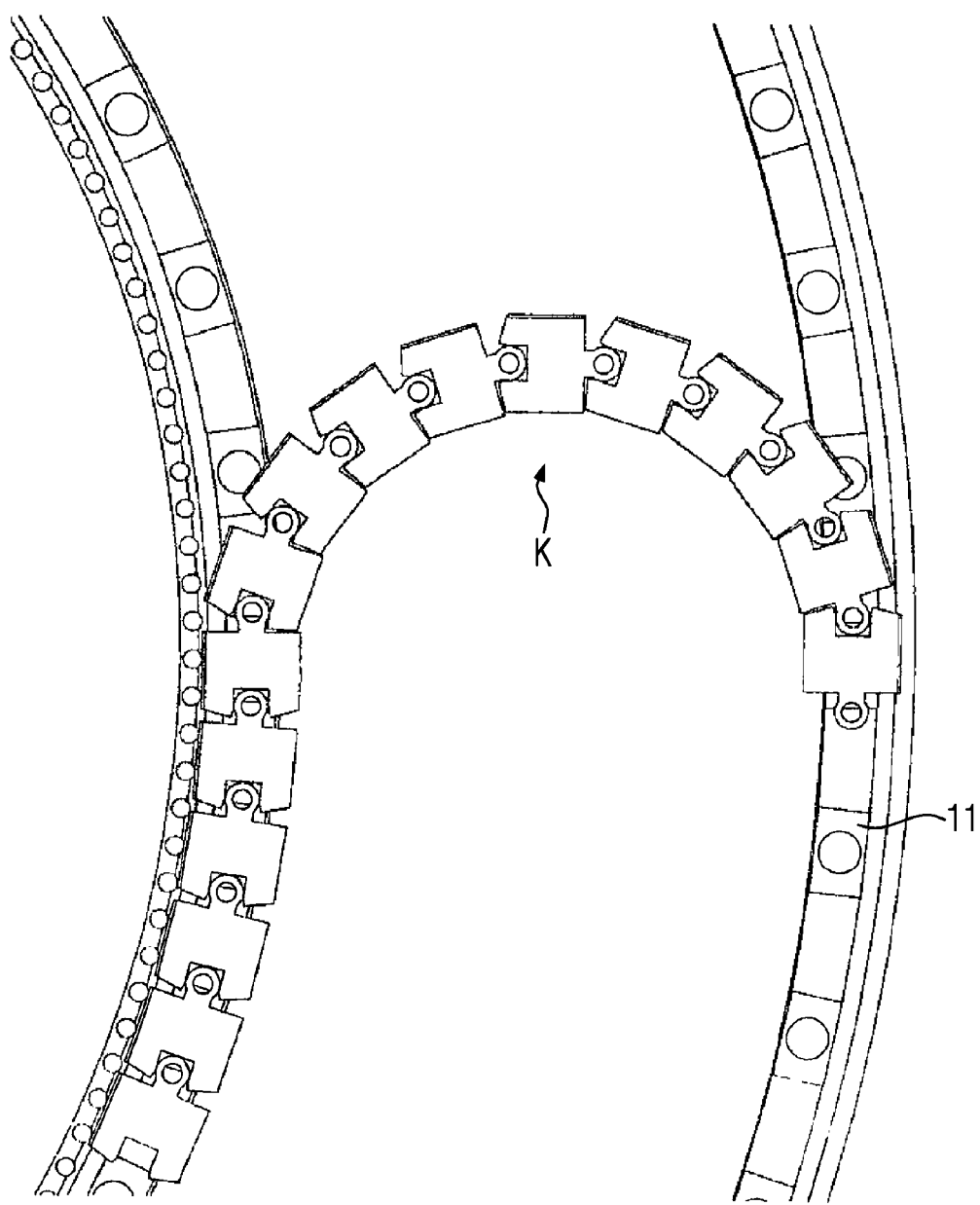

In FIGS. 9 to 11, such alternative embodiments are shown which realize the mechanical and/or magnetic couplings between the links 11 referred to as shuttles and the bottle carriers 7 of the bottle carrier chain K.

The invention claimed is:

1. Conveyor system, comprising at least one variable capacity storage, at least two guides running laterally adjacent and at least one transfer guide for a bottle carrier chain of curve-going coupled bottle carriers, the runs of the bottle carrier chain being transferable from one of the guides to one of the adjacent guides via the transfer guide and are drivable along the at least two guides, each of the at least two guides comprising a continuous tension member drivable by at least one conveyor drive of the conveyor system, and a respective run of the bottle carrier chain is guided by a tension member along a certain distance of the tension member and wherein the bottle carrier chain is drivable over the certain distance in mutual contact with the tension member by means of one of multiple positive-fit couplings, magnetically engaging couplings, and a combination thereof, which in the area of the transfer guide are automatically releasable and engageable.

2. The conveyor system according to claim 1, wherein each of the couplings is releasable and engageable by a relative movement of at least one bottle carrier relative to the tension member, and wherein the transfer guide exerts a force onto the at least one bottle carrier.

3. The conveyor system according to claim 1, wherein at least in the storage, the transfer guide is a transfer return bend, disposed movably along the guides, for the bottle carrier chain formed in an endless manner, the tension members are drivable along the guides in opposite directions at variable speeds, the couplings are automatically releasable and engageable during the movement of the bottle carries in the transfer return bend.

4. The conveyor system according to claim 1, wherein the at least two guides includes more than two guides, each comprising one tension member, and wherein at least two tension members are driven in the same direction and another tension member in the opposite direction, and the transfer guide is one of a switch for changing paths of the bottle carrier chain between the tension members or a transfer return bend for deflecting the bottle carrier chain between tension members.

5. The conveyor system according to claim 1, wherein the tension member is a link chain with links.

6. The conveyor system according to claim 1, wherein consecutive bottle carriers are coupled to each other in a pivot joint or in a pivot/slide joint having a joint axis being essentially perpendicular to the drive direction of the tension member in pivotable or pivotable/slideable manner.

7. The conveyor system according to claim 4, wherein in the path, the bottle carrier chain is guided one of either above or below the tension member, respectively, or laterally adjacent to said tension member.

8. The conveyor system according to claim 1, wherein each magnetic engagement coupling comprises at least one permanent magnet and one of an armature element or a second permanent magnet with opposite magnetic polarization at the tension member, being magnetically attractable by the permanent magnet, and a bottle carrier, and wherein the tension member and the bottle carrier chain, the permanent magnets, a permanent magnet and an armature element, and a combination thereof can be brought into contact by the magnet engagement force.

9. The conveyor system according to claim 7, wherein said permanent magnets or armature elements, respectively, are formed plate-like or disc-shaped and are arranged at outside or sunk-in support surfaces of the tension member or said bottle carriers, respectively.

10. The conveyor system according to claim 2, wherein the relative movement occurs in a plane being defined by the transfer guide and wherein the one of magnetic engagement, positive fit, and combination thereof of the coupling is oriented in or perpendicular to the plane.

11. The conveyor system according to claim 1, wherein the positive-fitting coupling at the tension member and the bottle carrier comprise a lateral hook and lateral hook receptacle, which in the engaged state engage in the direction of tension of the tension member up to the contact between the tension member and the bottle carrier and interlock with each other transverse to the direction of tension.

12. The conveyor system according to claim 11, wherein the hook is arranged at a link of the tension member formed as a link chain and the hook simultaneously forms a positioning nose for a bottle carrier following in the direction of tension.

13. The conveyor system according to claim 1, wherein the positive fit and magnetically engaging coupling comprises engagement and counter-engagement elements joinably engageable laterally to the direction of tension at the tension member and the bottle carrier, which in the engaged state engage in the direction of tension of said tension member with driving contact, and at least one permanent magnet and an armature element or a second permanent magnet with opposite magnetic polarization, are magnetically attractable by the at least one permanent magnet, and are mounted at the tension member and at the bottle carrier.

14. The conveyor system according to claim 1, wherein between one of the coupling and the pivot joint, the pivot/slide joint of the bottle carriers, and a combination thereof a distance X defined by a release lever is provided.

15. The conveyor system according to claim 1, wherein each bottle carrier is provided with at least one coupling.

16. The conveyor system according to claim 1, wherein the bottle carrier comprises at least one bottle platform or at least one bottle gripper.

17. The conveyor system according to claim 1, wherein the bottle carriers are at least essentially identical injection-molded plastic elements.

18. The conveyor system according to claim 1, wherein the tension member is drivable by one conveyor motor or simultaneously by several conveyor motors.

19. The conveyor system according to claim 3, wherein at least in the storage, the guides of the tension members are arranged in a curved manner, and the tension member formed as a link chain is prevented from ascending on the inside of the curve on rollers and on the outside by fingers of the link chain reaching under a guide member of the guide.

20. The conveyor system according to claim 1, wherein the at least one variable capacity storage is for a bottle treatment machine.

21. The conveyor system according to claim 3, wherein the tension members are drivable along the guides independently of each other.

22. The conveyor system according to claim 4, wherein the tension members are driven at different speeds.

23. The conveyor system according to claim 5, wherein the bottle carrier chain and the link chain comprise identical partitions or different partitions.

24. The conveyor system according to claim 6, wherein the pivotable or pivotable/slideable manner of the tension member is in two opposite directions.

25. The conveyor system according to claim 16, wherein the bottle platform has at least one outside stop.

26. The conveyor system according to claim 18, wherein the tension member is drivable outside for the at least one variable capacity storage.

27. The conveyor system according to claim 18, wherein the several conveyor motors are arranged closely consecutive.

28. The conveyor system according to claim 19, wherein the guides arranged in a curved manner follow a spiral path or a helical conveyor path.

* * * * *